(12) United States Patent
Echevarria Lopez et al.

(10) Patent No.: US 11,413,822 B2
(45) Date of Patent: Aug. 16, 2022

(54) 3D PRINTING CHAMBER TEMPERATURE

(71) Applicant: HEWLETT-PACKARD DEVELOPMENT COMPANY, L.P., Spring, TX (US)

(72) Inventors: David Echevarria Lopez, Sant Cugat del Valles (ES); Alejandro Torres Pinero, Sant Cugat del Valles (ES); Francesc Salas Roura, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 16/607,602

(22) PCT Filed: Jul. 25, 2018

(86) PCT No.: PCT/US2018/043705
§ 371 (c)(1),
(2) Date: Oct. 23, 2019

(87) PCT Pub. No.: WO2020/023032
PCT Pub. Date: Jan. 30, 2020

(65) Prior Publication Data
US 2021/0354391 A1    Nov. 18, 2021

(51) Int. Cl.
*B29C 64/364* (2017.01)
*B29C 64/295* (2017.01)
(Continued)

(52) U.S. Cl.
CPC .......... *B29C 64/364* (2017.08); *B29C 64/165* (2017.08); *B29C 64/264* (2017.08);
(Continued)

(58) Field of Classification Search
CPC ... B29C 64/364; B29C 64/393; B29C 64/295; B29C 64/153; B29C 64/165;
(Continued)

(56) References Cited

U.S. PATENT DOCUMENTS

2018/0117713 A1   5/2018   Bauer et al.
2019/0168446 A1*  6/2019   Leibig .................. B29C 64/118

FOREIGN PATENT DOCUMENTS

CA      2971675 A1     6/2016
CN    107225761 A     10/2017
(Continued)

*Primary Examiner* — Mary Lynn F Theisen
(74) *Attorney, Agent, or Firm* — HP Inc. Patent Department

(57) ABSTRACT

Examples relate to a 3D printing system comprising a connection to a 3D printing chamber; an energy source to apply energy to a 3D build material and an energy source chamber separate from the 3D printing chamber. The energy source chamber contains the energy source. The 3D printing system comprises an air valve system, the air valve system comprising a first valve element selectively connecting the energy source chamber and the connection to the 3D printing chamber and a second valve element selectively connecting an external air input and the connection to the 3D printing chamber. The 3D printing system also comprises a first sensor measuring a temperature representative of a temperature in the 3D printing chamber and an air valve controller connected to the air valve system to regulate the temperature in the 3D printing chamber in function of data provided by the sensor.

15 Claims, 3 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)
  *B29C 64/264* (2017.01)
  *B29C 64/165* (2017.01)
  *B33Y 40/10* (2020.01)

(52) U.S. Cl.
  CPC .......... *B29C 64/295* (2017.08); *B29C 64/393* (2017.08); *B33Y 40/10* (2020.01); *B33Y 10/00* (2014.12); *B33Y 30/00* (2014.12); *B33Y 50/02* (2014.12)

(58) Field of Classification Search
  CPC ... B29C 64/264; B29C 64/268; B29C 64/277; B29C 64/282; B33Y 10/00; B33Y 50/02
  See application file for complete search history.

(56) References Cited

FOREIGN PATENT DOCUMENTS

| | | |
|---|---|---|
| CN | 107225765 A | 10/2017 |
| CN | 207273889 U | 4/2018 |
| WO | WO2004044816 A1 | 5/2004 |
| WO | WO2016068899 A1 | 5/2016 |
| WO | WO2017138915 A1 | 8/2017 |

* cited by examiner

3D PRINTING CHAMBER TEMPERATURE

BACKGROUND

Additive manufacturing techniques, such as three-dimensional (3D) printing, relate to techniques for making three-dimensional objects from a digital three-dimensional model through additive processes. In these processes, three-dimensional objects may be generated on a layer-by-layer basis under computer control. A large variety of additive manufacturing technologies have been developed, differing in deposition techniques and processes by which the three-dimensional object is formed from a material.

BRIEF DESCRIPTION OF THE DRAWINGS

Various example features will be apparent from the detailed description which follows, taken in conjunction with the accompanying drawings, wherein.

Figure 1:
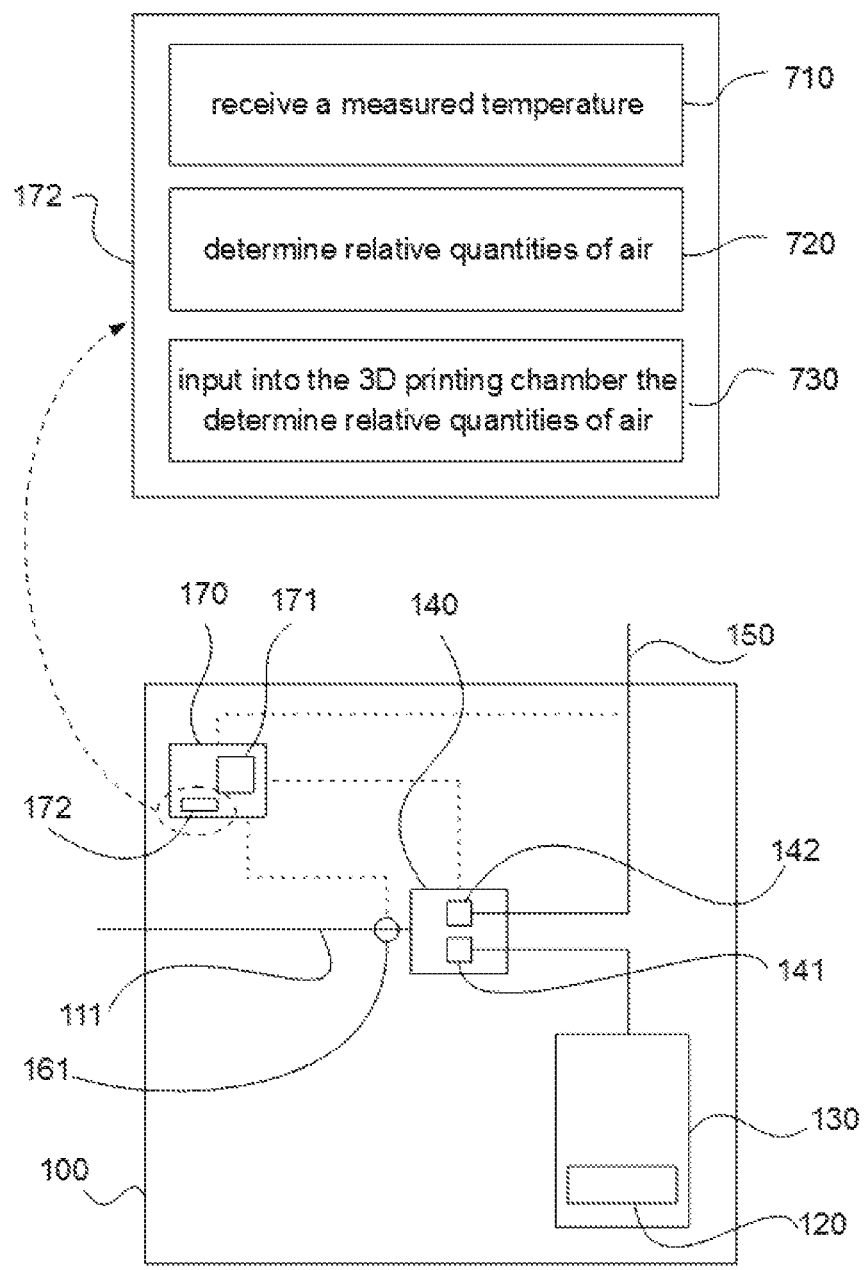
FIG. 1 schematically illustrates an example of a 3D printing system according to the present disclosure and a zoom-in view schematically representing a non-transitory machine readable storage medium according to the present disclosure.

DETAILED DESCRIPTION 3D or 3-D printing are acronyms that refer to three-dimensional printing. These terms are interchangeably used in this disclosure. In some 3D printing techniques a build material in the form of a particle material, e.g. powder, is deposited layer-by-layer inside a 3D printing chamber to generate a three-dimensional object. In some examples, a chemical binding agent may be applied where the particles are to bond together. In an example a chemical binding system such as a liquid binding agent selectively deposited to join powder particles of a 3D build material is used. In an example a binding agent is used for metal 3D printing whereby a 3D build material comprises a metal. A bonding energy may be applied to a 3D build material during a bonding process. In some examples, a fusing agent may be applied in those areas where the particles are to fuse together. Such a fusing process may involve exposing the 3D build material to a fusing energy. This fusing energy may be applied to the 3D build material by one or more fusing elements. In some examples, the fusing elements may comprise lamps. The lamps may irradiate radiation to fuse the 3D build material where the fusing agent was applied. In some examples, the lamps may be ultraviolet lamps. In other examples, the lamps may irradiate radiation at other frequencies. In some examples, lamps may be arranged in groups called a fusing module. In some examples, the 3D printing system may comprise 6 lamps distributed in 2 fusing modules, each module having 3 lamps. In some examples, the 3D printing system may comprise between 2 and 10 lamps. In some examples, the power of each of the lamps may be between 1000 W and 3000 W. In other examples, the one or more fusing elements may comprise infrared radiators or electrical resistances.

In some examples, the one or more fusing elements may be arranged on a mobile structure which moves the fusing elements for applying energy to the 3D build material. When fusing elements are not applying energy to the 3D build material, the mobile structure may move the fusing elements away from a printing area. In another example, the fusing elements may be arranged on a fixed structure, for example in a top region of a 3D printing chamber.

In some 3D printing systems, the 3D build material may be pre-heated to a temperature below a melting point of the 3D build material before applying the fusing energy. A pre-heating system may be used for pre-heating the 3D build material. In some examples, the pre-heating system may pre-heat the 3D build material by infrared radiators, electrical resistances or lamps. In some examples, the pre-heating system may be arranged in a top region of a printing chamber.

In some examples, the 3D printing system may comprise a fusing element and a pre-heating system. In some examples, both the fusing element or the fusing elements and the pre-heating system may use a same technology type, e.g. lamps, for respectively fusing the 3D build material and pre-heating the 3D build material. In another example, the fusing elements may use a first technology and the pre-heating system a second different technology. In some examples, the fusing elements may comprise lamps and the pre-heating system may comprise electrical resistances. In some examples, the pre-heating system may provide energy to maintain a temperature of the 3D build material within a predetermined range during a first range of time. The fusing element may provide energy to fuse 3D build material during a second range of time. The second range of time may be included in the first range of time, and the second range of time may be smaller than the first range of time.

The 3D printing system may comprise a temperature control system for maintaining the 3D printing chamber in a predetermined temperature range. Relatively stable thermal conditions in the 3D printing chamber may help to ensure quality and repeatability in the 3D printing process. Some 3D build materials, binding agents or fusing agents may perform differently depending on temperature. Heating or cooling the 3D printing chamber may therefore be of use.

FIG. 1 schematically illustrates an example of a 3D printing system 100 according to the present disclosure. The 3D printing system 100 comprises a connection 111 to a 3D printing chamber and an energy source 120 to apply energy to a 3D build material. The energy source 120 is contained in an energy source chamber 130. The energy source chamber is separate from a 3D printing chamber. In this example, an energy source chamber separate from a 3D printing chamber should be understood as the energy source chamber being airtight with respect to a 3D printing chamber, i.e. there is no direct passage of air from the energy source chamber to a 3D printing chamber. As the energy source chamber is separate from a 3D printing chamber, contamination from one chamber to the other may be prevented.

The 3D printing system 100 further comprises an air valve system 140 comprising a first valve element 141 selectively connecting the energy source chamber 130 and the connection 111 to a 3D printing chamber and a second valve element 142 selectively connecting an external air input 150 and the connection 111 to a 3D printing chamber. Selective valves may be totally open, partially open or totally closed. Therefore, the valves may allow the air from the external air input and/or from the energy source chamber to completely pass or to partially pass or not to flow or pass through towards a 3D printing chamber through the connection 111.

In addition, the 3D printing system 100 comprises a first sensor 161 measuring a temperature representative of the temperature in the 3D printing chamber. Furthermore, the 3D printing system 100 comprises an air valve controller 170 connected to the air valve system 140 to regulate the temperature in the 3D printing chamber in function of data provided by the sensor 161.

In an example, the first valve element is operated to increase a flow from the energy source chamber to the connection to a 3D printing chamber if the temperature representative of the temperature in the 3D printing chamber should be raised.

In an example, the second valve element is operated to increase a flow of external air to the connection to a 3D printing chamber if the temperature representative of the temperature in the 3D printing chamber should be lowered.

In some examples, the system may further comprise a second sensor measuring a temperature representative of the temperature at the external air input 150. In some examples, the system may comprise a third sensor measuring a temperature representative of the temperature in the energy source chamber 130. A temperature representative of a temperature in the chambers or of the external air input represents or indicates the temperature in these locations. The temperature directly measured by the sensors may be corrected to represent the temperature in these chambers and of the external air input. For example, if a sensor for measuring the temperature in the energy chamber is arranged relatively close to the energy source, the temperature obtained by this sensor may be corrected to represent the temperature in the energy source chamber, e.g. an average temperature inside the energy source chamber, minimizing the influence of being arranged close to the energy source. This corrected temperature may be the temperature representative in the energy source chamber. In some examples, one or more of the sensors may be arranged outside the chambers or not directly measuring the external air input for example for constructive reasons. The directly measured temperatures may also be corrected to represent the temperature in the chambers or of the external air input.

The sensor 161 may represent or indicate a temperature representative of the temperature in a 3D printing chamber. In some examples, the sensor measuring a temperature representative of the temperature in a 3D printing chamber may be arranged in the connection to a 3D printing chamber. The first sensor may measure a temperature of air entering into a 3D printing chamber. In some examples, the first sensor 161 may be arranged in a 3D printing chamber. In some examples, the first sensor may be arranged in the air valve system. In some examples, a first sensor may directly measure a temperature inside a 3D printing chamber.

According to an example, the temperature inside a 3D printing chamber may be controlled as air from the external air input 150 and air from the energy source chamber 130 may flow into a 3D printing chamber through the connection 111. Using external air provides a simpler and a more cost effective solution than using, for example, gases having a specific composition. In this example, the external air shall be understood as the mixture of gases comprising approximately 78.08% of nitrogen, 21.95% of oxygen, 0.93% of argon and 0.04 of other gases by volume. Such other gases may comprise among others carbon dioxide and neon.

The temperature representative of the temperature of the external air may be lower than the temperature representative of the temperature in a 3D printing chamber. The temperature representative of the temperature in the energy source chamber may be higher than the temperature representative of the temperature in a 3D printing chamber. Depending on the temperature representative of the temperature in a 3D printing chamber, a quantity of air flowing from the external air input 150 and from the energy source chamber 130 into the 3D printing chamber may be controlled by the air valve system 140. In some examples, the air valve controller 170 may control an aperture of the first 141 and of the second 142 valve elements. A quantity or an amount of air may comprise a volume, a mass or a molecular weight of this air. A quantity of air may also comprise mass flux or volumetric flux. In some examples, a temperature representative of the temperature of the external air input 150 may be measured by a second sensor. In some examples, a temperature representative of the temperature in the energy source chamber 130 may be measured by a third sensor. Temperatures measured by these sensors may also be taken into account by the air valve controller to regulate the temperature in a 3D printing chamber. The air valve system may comprise one or more fan mechanisms to move the air through the air valve system.

Controlling the quantity of air flowing at different temperatures into a 3D printing chamber may allow stabilizing the temperature inside a 3D printing chamber. If the temperature in a 3D printing chamber is stable, overheating of machines, e.g. printer elements, working in a 3D printer chamber occurring after working for a relatively long time does not negatively affect the temperature inside a 3D printing chamber and the quality of a 3D printing process may thus be increased. Furthermore, printer elements of different 3D printing systems 100 according to this disclosure may function under stable temperature parameters irrespective of the environment in which they are installed. Similar quality standards may thus be achieved in different environments.

In addition, the 3D printing system 100 leverages the energy produced by the energy source 120 used to apply energy to the 3D build material. Therefore, the global energy consumption of the system may be reduced and the process may be more efficient. Dedicated heating sources for heating a 3D printing chamber may consequently be avoided. Energy efficiency is therefore increased.

In some examples, the energy source 120 may comprise a fusing element to fuse the 3D build material. The heat generated by the fusing element may fuse the 3D build material. The energy applied to a 3D build material from a fusing element may indirectly heat a 3D printing chamber because layers of the 3D build material may partially absorb a part of the energy delivered by the fusing element. In addition, the heat generated by the fusing element inside the energy source chamber 130 may be used to heat a 3D printing chamber through the air valve system. In some examples, the energy source may comprise a pre-heating system to pre-heat the 3D build material. Thus, the heat from the pre-heating system may also heat the chamber containing the pre-heating system. This heat in the chamber containing the pre-heating system may be leveraged to heat a 3D printing chamber. Therefore, heat from the chambers containing an existing energy source or sources may be used to heat a 3D printing chamber.

In some examples, the connection 111 to a 3D printing chamber may be a single connection. For example, the first valve element 141 and the second valve element 142 may be both connected to a single connection 111 to a 3D printing chamber, e.g. a single air input. In some examples, the external air input 150 and air from the energy source chamber 130 may be mixed in the connection 111 to a 3D printing chamber. Therefore, air may be mixed before entering or flowing into a 3D printing chamber. In some examples, the connector may be a conduit which connects the first 141 and the second 142 valve elements to a 3D printing chamber.

In some examples, the connection 111 to a 3D printing chamber may comprise separate air inputs for air from the external air input and from the energy source chamber. One conduit may connect the first valve element and a 3D printing chamber and another separate conduit may connect the second valve element and a 3D printing chamber.

In some examples, a conduit may connect the external air input 150 and the second valve element 142. In some examples, the energy source chamber 130 and the first valve element 141 may be connected by a conduit.

In FIG. 1, a 3D printing chamber is not represented. In some examples, a 3D printing chamber may be removably comprised in the 3D printing system. For example, a 3D printing chamber may be arranged at the 3D printing system when in use. In some examples, a 3D printing chamber may be a part of the 3D printing system, or it may be separate and removable from the 3D printing system.

In FIG. 1, the energy source chamber 130 may be arranged separate from a 3D printing chamber. The energy source chamber may thus be airtight with respect to a 3D printing chamber. In some examples, an energy source chamber separate from a 3D printing chamber may comprise an energy source chamber adjacent to a 3D printing chamber or an energy source chamber arranged inside or partially inside a 3D printing chamber. In some examples, the energy source chamber may be substantially transparent or comprise a transparent wall or section to apply the energy to the 3D build material when the 3D build material is in a 3D printing chamber. For example, the energy source chamber may comprise a wall made of transparent glass or plastic resin allowing the energy from the energy source to be directed through said wall towards the 3D build material.

The 3D printing system 100 may comprise a filter system to filter the air flowing into a 3D chamber. Contamination inside the printing chamber may thus be avoided or reduced. In some examples, the filter system may comprise a filter element arranged in the connection 111, i.e. between the air valve system 140 and a 3D printing chamber. In some examples, the filter system may comprise one or more filter elements arranged between the external air input 150 and the air valve system 140 and/or between the energy source chamber 130 and a 3D printing chamber.

In FIG. 1 the air valve controller 170 includes a processor 171 and a non-transitory machine readable storage medium 172. The non-transitory machine readable storage medium 172 is coupled to the processor 171.

The processor 171 performs operations on data. In an example, the processor is an application specific processor, for example a processor dedicated to control the temperature inside a 3D printing chamber. The processor 171 may also be a central processing unit.

The non-transitory machine readable storage medium 172 may include any electronic, magnetic, optical, or other physical storage device that stores executable instructions. The non-transitory machine-readable storage medium 172 may be, for example, Random Access Memory (RAM), an Electrically-Erasable Programmable Read-Only Memory (EEPROM), a storage drive, an optical disk, and the like.

FIG. 1 additionally comprises a zoom-in view schematically representing an example of a non-transitory machine-readable storage medium 172 according to the present disclosure. The non-transitory machine-readable storage medium is encoded with instructions which, when executed by the processor 171, cause the processor to capture a measured temperature representative of a temperature in a 3D printing chamber as represented at block 710, determine relative quantities of air from an energy source chamber 130 and of an external air input 150 to maintain the temperature of a 3D printing chamber in a predetermined temperature range as represented at block 720 and input into the 3D printing chamber the determined relative quantities of air as represented at block 730. The relative quantities of air may be, for example, a proportion of gases by volume, by weight or by molecular weight.

The measured temperature of block 710 is the temperature representative of a temperature in a 3D printing chamber. This temperature may be measured by the first sensor 161. In some examples, the instruction may also cause the processor to capture measured temperatures representative of a temperature of the external air input 150 and in the energy source chamber 130. These additional temperatures may be measured by second and third sensors respectively, whereby such sensors may generate data. After acquiring this data, i.e. information about the temperature measured by the sensor or sensors, the processor executes instructions to determine the relative quantities of air from the external air input and from the energy source chamber as represented at block 720. At block 730, the determined relative quantities of air are inputted into a 3D printing chamber by operating the air valve controller 170. The determined relative quantities of air are inputted into a 3D printing chamber through the connection 111. The air valve controller 170 is connected to an air valve system having a first valve element selectively connecting the energy source chamber and the connection 111 to a 3D printing chamber and a second valve element selectively connecting the external air input and the connection 111 to a 3D printing chamber.

The instructions encoded in the non-transitory machine readable storage medium for the processor represented at blocks 710, 720 and 730 may participate in making a 3D printing chamber having a temperature within a desired range for producing desired mechanical properties of a 3D object.

In some examples, the non-transitory machine readable storage medium 172 may further cause the processor 171 to determine an aperture of the first valve element and an aperture of the second valve element in function of the determined relative quantities of air.

Figure 2:
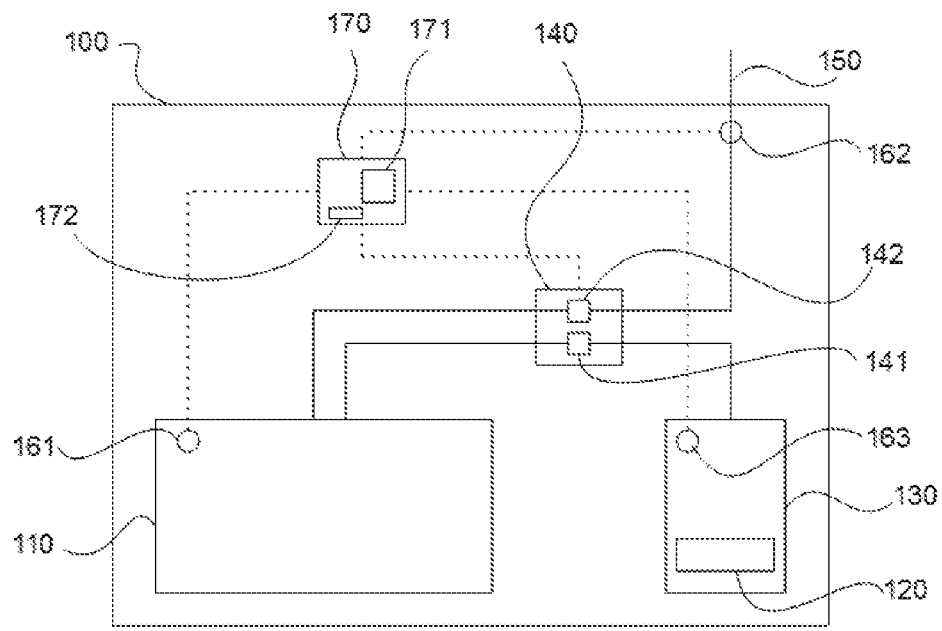
FIG. 2 schematically illustrates another example of a 3D printing system according to the present disclosure.

FIG. 2 schematically illustrates another example of a 3D printing system 100 according to the present disclosure. In FIG. 2 the 3D printing system 100 comprises a 3D printing chamber 110 and an energy source chamber 130 comprising an energy source 120 to apply energy to a 3D build material. In this example, a 3D printing chamber 110 is integrated into the 3D printing system 100. In some examples, a 3D printing chamber may be coupled to the 3D printing system prior to starting a printing operation. In this example, the 3D printing system 100 further comprises first 161, second 162 and third 163 sensors measuring a temperature representative of the temperature in a 3D printing chamber 110, of the external air 150 and in the energy source chamber 130 respectively. The 3D printing system 100 additionally comprises an air valve controller 170 connected to an air valve system 140 to regulate or control the temperature in a 3D printing chamber 110 in function of the measured temperatures provided by the sensors 161, 162 and 163. These sensors may generate data. This data may be used by the air valve controller to control the air valve system. Using data from three sensors enhance the accuracy and reliability of the control of the temperature.

In FIG. 2, the connection to a 3D printing chamber may comprise two different air inputs to a 3D printing chamber. In some examples, a conduit may connect the first valve element 141 and a 3D printing chamber. Another conduit may connect the second valve element 142 and a 3D printing chamber.

Figure 3:
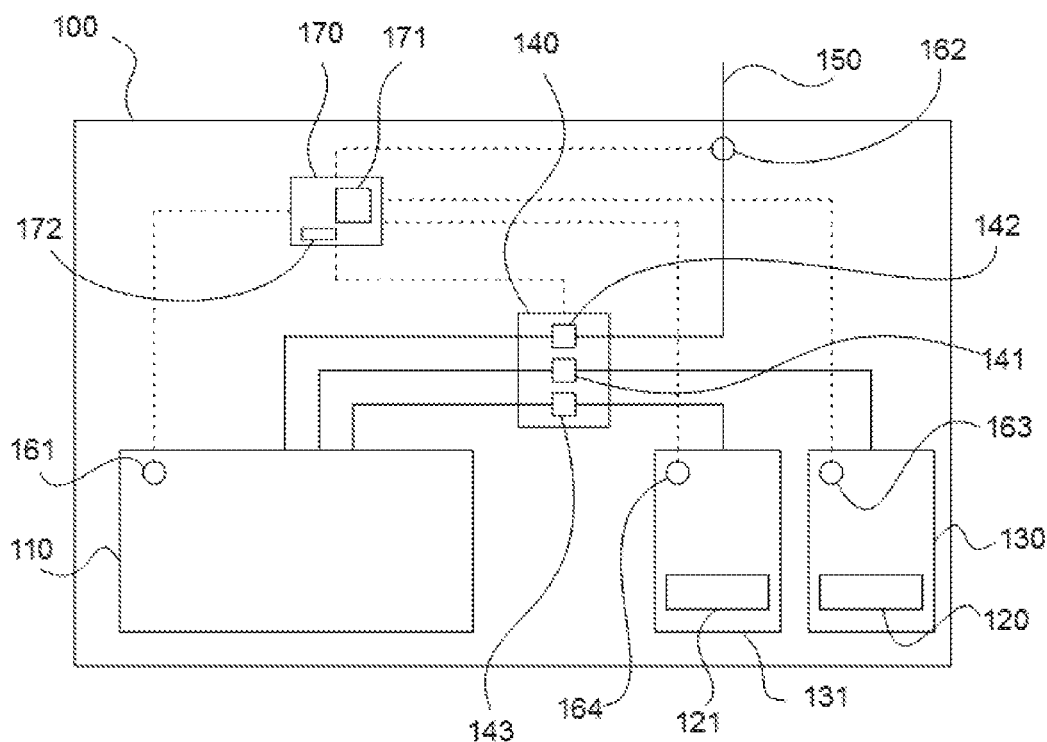
FIG. 3 schematically illustrates a further example of a 3D printing system according to the present disclosure.

FIG. 3 schematically illustrates another example of a 3D printing system 100 according to the present disclosure. The 3D printing system 100 comprises a 3D printing chamber 110 to print a 3D object from a 3D build material and an energy source chamber 130. The energy source chamber 130 comprises an energy source 120 to apply energy to a 3D build material. The 3D printing system 100 may comprise first 161, second 162 and third 163 sensors measuring a temperature representative of the temperature in a 3D printing chamber 110, of the external air 150 and in the energy source chamber 130 respectively. The 3D printing system 100 additionally comprises an air valve controller 170 connected to an air valve system 140 to regulate or control the temperature in a 3D printing chamber in function of measured temperatures provided by the sensors 161, 162 and 163. The air valve system 140 comprises a first valve element 141 controlling the air flow from the energy source chamber 130 to the 3D printing chamber 110 and a second valve element 142 controlling the air flow from the external air input 150 to the 3D printing chamber 110.

As schematically illustrated in FIG. 3, the 3D printing system 100 may comprise an additional energy source 121 to apply energy to the 3D build material. In some examples, the energy source 120 may comprise a fusing element to fuse the 3D build material and the additional energy source 121 may comprise a pre-heating system to pre-heat the 3D build material.

In FIG. 3 the additional energy source 121 is contained in an additional energy source chamber 131. An additional valve element 143 may selectively connect the additional energy source chamber 131 and a 3D printing chamber 110, i.e. controls the air flow from the additional energy source chamber 131 to a 3D printing chamber 110. An additional sensor 164 may measure a temperature representative of the temperature of the additional energy source chamber 131. The air valve controller 170 may thus also take into account data provided by this additional sensor 164 to regulate the temperature in a 3D printing chamber 110. The 3D printing system 100 of FIG. 3 may thus use air to regulate or control the temperature in a 3D printing chamber 110 from the external air input 150, from the energy source chamber 130 and/or from the additional source chamber 131.

In some examples, a conduit may connect the additional energy source chamber 131 and the additional valve element 143. In some examples, the valve elements may be connected to a single connection into a 3D printing chamber 110.

In FIG. 3, the additional energy source chamber 131 is separate from the energy source chamber 130. Contamination between chambers may thus be prevented. The energy source chambers may be arranged apart from each other. For example, the additional energy source chamber may be arranged inside the 3D printing chamber and the energy source chamber may be arranged apart from or adjacent to the 3D printing chamber. The additional energy source may be a pre-heating system and the energy source may be a fusing element. For instance, the pre-heating system may be arranged in the additional energy source chamber inside the 3D printing chamber, e.g. having transparent walls, and the fusing element may be arranged in the energy source chamber adjacent to the 3D printing chamber.

In some examples, the additional energy source chamber may be arranged adjacent or inside the energy source chamber.

In some examples, both the energy source chamber and the additionally energy source chamber may be arranged adjacent or inside or partially inside a 3D printing chamber.

In some examples, the energy source chamber may include the additional energy source. In these examples, the third sensor measures the temperature in the energy source chamber which is dependent on both the energy source 120, e.g. a fusing element, and the additional energy source 121, e.g. a pre-heating system.

Figure 4:
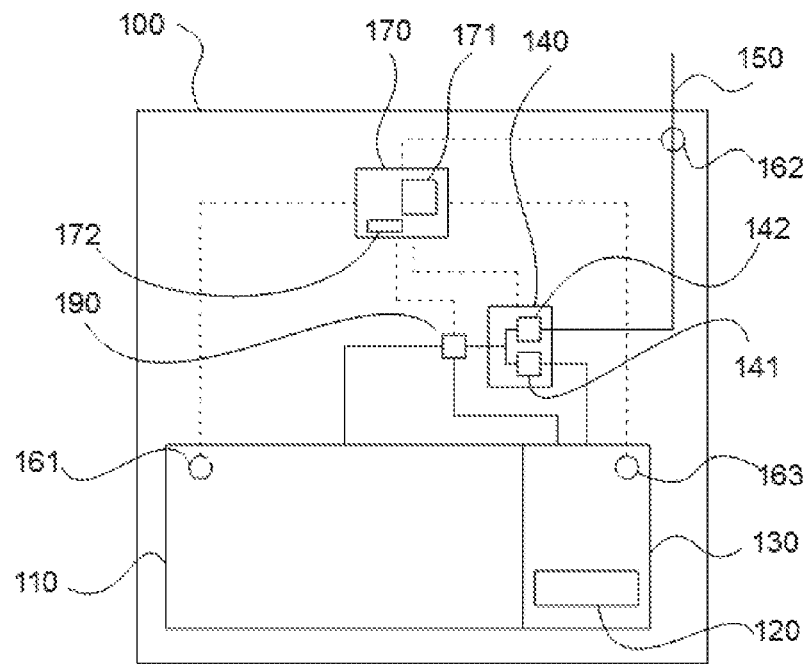
FIG. 4 schematically illustrates yet a further example of a 3D printing system according to the present disclosure.

FIG. 4 schematically illustrates yet another example of a 3D printing system 100 according to the present disclosure. The 3D printing system 100 comprises a 3D printing chamber 110, an energy source 120 to apply energy to a 3D build material contained in an energy source chamber 130 and an external air input 150. The 3D printing system 100 may further comprise first 161, second 162 and third 163 sensor measuring a temperature representative of the temperature in the 3D printing chamber 110, of the external air 150 and in the energy source chamber 130 respectively. The 3D printing system 100 additionally comprises an air valve controller 170 connected to an air valve system 140 to regulate or control the temperature in the 3D printing chamber in function of data provided by the sensors 161, 162 and 163. The air valve system 140 comprises a first valve element 141 and a second valve element 142. The first valve element 141 selectively connects the energy source chamber 130 and a 3D printing chamber 110 through a connection to regulate the quantity of air flowing from the energy source chamber 130 to the 3D printing chamber 110. The second valve element 142 selectively connects the external air input 150 and a 3D printing chamber 110 through the connector to regulate the quantity of air flowing from the external air input 150 to the 3D printing chamber 110.

In FIG. 4, the 3D printing system 100 comprises an additional valve element 190 selectively connecting the air valve system 140 and the energy source chamber 130 to cool the energy source 120. The energy source may thus be selectively cooled if an excessive temperature is detected in the energy source chamber. For example, if the energy source 120 is a fusing element, air from the additional valve element 190 may help to prevent the fusing element from reaching an excessive temperature.

In some examples, the air valve controller 170 may further regulate the temperature in the energy source chamber 130 to cool the energy source 120. In some of these examples, the additional valve element 190 may be arranged in the connection to a 3D printing chamber, i.e. between the output of the first 141 and second 142 valve elements and the 3D printing chamber 110. Alternatively, the additional valve 190 may selectively connect the external air input 150 and the energy source chamber 130 to cool the energy source 120 with external air for example by using a three-way valve.

Figure 5:
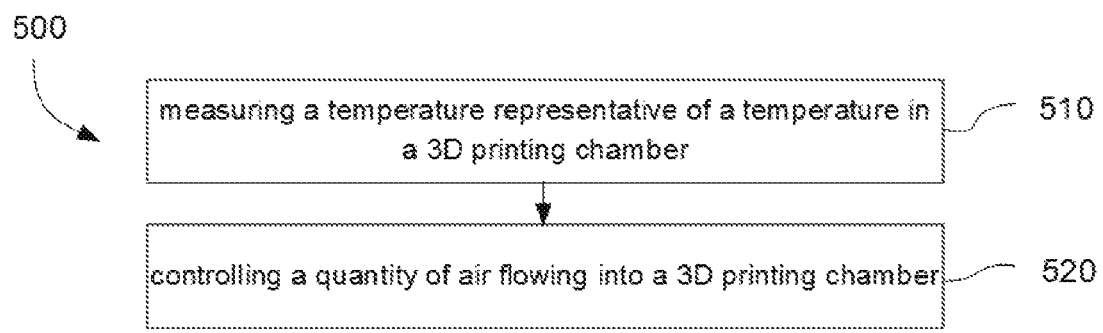
FIG. 5 is a block diagram of an example of a method to control temperature in a 3D printing chamber according to the present disclosure.

FIG. 5 is a block diagram of an example of a method 500 to control temperature in a 3D printing chamber according to the present disclosure.

In some examples, the method 500 may be applied to any of the examples of 3D printing systems herein described.

Block 510 represents measuring a temperature representative of a temperature in a 3D printing chamber. In some examples, a temperature representative of a temperature of an external air input selectively connected to the 3D printing chamber and a temperature representative of a temperature in an energy source chamber selectively connected to the 3D printing chamber may also be measured.

At Block 520 controlling a quantity of air from the external air input and from the energy source chamber flowing into the 3D printing chamber in function of the measured temperature is represented. If different representative temperatures are measured, these temperatures may also be taken into account for controlling the quantity of air. By controlling the quantity, e.g. volume, flux or mass, of the external air input and of the air from the energy source chamber flowing through an air valve system, the temperature in the 3D printer chamber may be controlled, e.g. modified or maintained. In some examples, a quantity of air flowing into the 3D printing chamber may be between 100 and 2000 liters/min. In some examples, a quantity of air flowing into the 3D printing chamber may be between 500 and 1500 liters/min.

In some examples, the quantity of air from the external air input and from the energy source chamber inputted into the 3D printing chamber through a connection may be controlled by the action of a valve system. For example, controlling an aperture of a first valve element selectively connecting the energy source chamber and a connection to the 3D printing chamber and an aperture of a second valve element selectively connecting the external air input and the connection to the 3D printing chamber may respectively regulate the quantity of external air and air from the energy source chamber flowing into the 3D printing chamber. In some examples, the valve elements may comprise a flow control valve. In other examples, the valve elements may comprise a solenoid valve.

In some examples, an air valve controller may determine the aperture of the valve elements of the valve system. Valve elements may therefore regulate the quantity of air flowing into the 3D printing chamber coming from the external air input and from the energy source chamber. The aperture of the first and of the second valve elements may depend on the measured temperature or temperatures. Varying the quantity of air from the external air and from the energy source chamber inputted into the 3D printing chamber, the temperature inside the 3D printing chamber may therefore increase, reduce or be maintained. In some examples, the temperature of the external air input is inferior to the temperature in the 3D printing chamber. Inputting external air into the 3D printing chamber may substantially cool the 3D build material in the 3D printing chamber. In some examples, the temperature in the energy source chamber may be superior to the temperature of the external air input. Air from the energy source chamber may thus raise the temperature inside the 3D printing chamber. In some examples, the temperature in the energy source chamber may be superior to the temperature in the 3D printing chamber. The air valve controller may determine relative quantities of air from the energy source chamber and of the external air input to maintain the temperature of the 3D printing chamber in a predetermined temperature.

In some examples, the temperature in the 3D printing chamber may be controlled during a 3D printing operation. In this way, a predetermined temperature is controlled when the 3D printing system is building a 3D object. In some examples, the temperature in the 3D printing chamber is not controlled when the 3D printing system is not in operation. Energy consumption may thus be reduced. In addition, the temperature may also be controlled before starting to print a 3D object to reach the predetermined temperature range before starting printing. The energy source may be switched on a few minutes, e.g. from 1 to 10 minutes, before starting printing. Air from the energy source chamber and from the external air input may thus be used to control the temperature of the 3D printing before starting printing.

The 3D objects may be generated by solidifying portions of successive layers of the 3D build material. The 3D build material may be powder-based and the properties of generated objects may be depended upon the type of material and the type of solidification. In some examples, the 3D build material may also comprise a fusing element to enhance the fusing and solidification of 3D build material when energy is applied to the 3D build material. In some examples, the 3D build material may comprise a binding agent to bond the particles of the 3D build material. Bonding process may be enhanced by applying energy to the 3D build material.

In some examples, the method of controlling a temperature in a 3D printing chamber may comprise maintaining the temperature in the 3D printing chamber within a predetermined temperature range. In these examples, the properties of the different layers of the 3D printing object may be homogenous.

In some examples, the temperature representative of the temperature in the 3D printing chamber may comprise an average temperature of air flowing into the 3D printing chamber. This average temperature may indicate a temperature of a quantity of air flowing into the 3D printing chamber. This average temperature may be measured in the connection to the 3D printing chamber.

In some examples, for example wherein the connection to the 3D printing chamber comprises one input for air from the external air input and another input for air from the energy source, an average temperature of a quantity of air flowing into the 3D printing chamber may be measured by sampling both the temperature of air coming from the external air input and from the energy source chamber. These temperatures may be weighted according to a relative quantity of air from the energy source chamber and of the external air input. An average temperature of a quantity of air flowing into the 3D printing chamber may be determined by the air valve controller. An average temperature of air flowing into the 3D printing chamber may thus indicate the temperature of a quantity of air flowing into the 3D printing chamber, e.g. in the connection to the 3D printing chamber, taking into account a relative quantity of the air from the external air input and from the energy source chamber.

In some examples, for example wherein air from the first valve element and from the second valve element is mixed in a single connection to flow into the 3D printing chamber, the first sensor may measure an average temperature of air in said single connection to the 3D printing chamber. This average temperature may indicate a temperature of a quantity of air flowing into the 3D printing chamber or through the connection to the 3D printing chamber.

In some examples, the method may comprise maintaining an average temperature of the air flowing into the 3D printing chamber within a predetermined range. Despite variations of the external temperature, the average temperature of the air entering into the 3D printing chamber may be maintained within this range. Air entering into the 3D printing chamber within a predetermined temperature range may increase a homogenous distribution of the temperature inside the 3D printing chamber. Inputting air within a predetermined average temperature range may allow the 3D system to reduce variations of temperature in some areas inside the 3D printing chamber during a period of time. For example, these areas may be zones of a printing area relatively close to the air input. Differences of mechanical properties of a 3D object may thus be minimized.

In some examples, the method may comprise maintaining an average temperature of air flowing into the 3D printing chamber between 20° C. and 40° C. In some examples, the method may comprise maintaining an average temperature of air flowing into the 3D printing chamber between 30° C. and 35° C. In some examples, the method may comprise maintaining an average temperature of air flowing into the 3D printing chamber between 31° C. and 33° C. In some examples, an average temperature of air entering into the 3D printing chamber may be maintained between 31.5° C. and 32.5° C. In some examples, the method may comprise maintaining an average temperature of air flowing into the 3D printing chamber at substantially about 32° C.

A desired temperature or desired temperature range in the 3D printing chamber may depend on a type of 3D build material used. In some examples, a temperature inside the 3D printing chamber may be between 50° C. and 250° C.

Suitable 3D build material for a 3D printing operation in the 3D printing system may comprise metal powders, polymers, nylon, crystalline plastics, semi-crystalline plastics, polyethylene (PE), polylactic acid (PLA), acrylonitrile butadiene styrene (ABS), amorphous plastics, polyvinyl alcohol plastic (PVA), polyamide, thermos (setting) plastics, polyamide 11 (PA11), polyamide 12 (PA12), polypropylene (PP) or a combination of any of the above mentioned materials. PA 11 or nylon 11 or polyamide 11 is a polyamide and bioplastic material member of the nylon family of polymers. PA 12 or nylon 12 or polyamide 12 is a thermoplastic and semi-crystalline material of the nylon family of polymers.

In some examples, the temperature of the external air input may be between 5° C. and 40° C. In some examples, the temperature of the external air input may be between 10° C. and 30° C. In some examples, the temperature in the energy source chamber may be between 50° C. and 100° C. In some examples, the temperature in the energy source chamber may be between 70° C. and 80° C.

In some examples, a quantity of relatively hot air from the energy source chamber, e.g. between 50° C. and 100° C., may be mixed with a quantity of relatively cold air from the external air input, e.g. between 5° C. and 40° C. The valve controller may determine the quantity of each of these sources of air flowing into the 3D printing chamber to reach a predetermined temperature representative of the temperature of the 3D printing chamber within a predetermined range. Depending on the temperature representative of the 3D printing chamber the relative quantity of air from the energy source chamber and from the external air input may vary. In some examples, such relative quantities may also vary in function of a temperature representative of the temperature in the energy source chamber and of the temperature in the external air input.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A 3D printing system comprising:
a connection to a 3D printing chamber;
an energy source to apply energy to a 3D build material;
an energy source chamber separate from the 3D printing chamber, the energy source chamber containing the energy source;
an air valve system comprising:
a first valve element selectively connecting the energy source chamber and the connection to the 3D printing chamber;
a second valve element selectively connecting an external air input and the connection to the 3D printing chamber;
a first sensor measuring a temperature representative of the temperature in the 3D printing chamber; and
an air valve controller connected to the air valve system to regulate the temperature in the 3D printing chamber in function of data provided by the sensor.

2. The 3D printing system according to claim 1, wherein the energy source comprises a fusing element to fuse the 3D build material.

3. The 3D printing system according to claim 1, wherein the energy source comprises a pre-heating system to pre-heat the 3D build material.

4. The 3D printing system according to claim 1, further comprising an additional energy source chamber containing an additional energy source to apply energy to the 3D build material.

5. The 3D printing system according to claim 4, wherein the energy source comprises a fusing element to fuse the 3D build material and the additional energy source comprises a pre-heating system to pre-heat the 3D build material.

6. The 3D printing system according to claim 1, wherein the air valve system comprises an additional valve element selectively connecting the air valve system and the energy source chamber to cool the energy source.

7. The 3D printing system according to claim 1, wherein the 3D printing system comprises the 3D printing chamber.

8. The 3D printing system according to claim 1, further comprising second and third sensors respectively measuring a temperature representative of the temperature of the external air and in the energy source chamber to provide further data to the air valve controller.

9. A method to control temperature in a 3D printing chamber comprising:
measuring a temperature representative of a temperature in a 3D printing chamber;
applying energy to a 3D build material with an energy source located in an energy source chamber; and
controlling a quantity of air from an external air input and from the energy source chamber flowing into the 3D printing chamber in function of the measured temperature.

10. The method according to claim 9, wherein controlling the quantity of air comprises controlling an aperture of a first valve element selectively connecting the energy source chamber and a connection to the 3D printing chamber and an aperture of a second valve element selectively connecting the external air input and the connection to the 3D printing chamber.

11. The method according to claim 9, further comprising:
measuring a temperature representative of:
a temperature of the external air input selectively connected to the 3D printing chamber, and
a temperature in the energy source chamber selectively connected to the 3D printing chamber; and wherein controlling a quantity of air is in function of the measured temperatures.

12. The method according to claim 9, wherein the temperature in the 3D printing chamber is controlled during a 3D printing operation.

13. The method according to claim 9, wherein the temperature representative of the temperature in the 3D printing chamber comprises an average temperature of a quantity of air flowing into the 3D printing chamber and the method comprises maintaining said average temperature between 20° C. and 40° C.

14. The method according to claim 9, wherein the temperature of the external air input is between 5° C. and 40° C. and the temperature in the energy source chamber is between 50° C. and 100° C.

15. A non-transitory machine readable storage medium encoded with instructions which, when executed by a processor, cause a 3D printing system to:

apply energy to a 3D build material with an energy source located in an energy source chamber;

capture a measured temperature representative of a temperature in a 3D printing chamber;

determine relative quantities of air from the energy source chamber and of an external air input to maintain the temperature in the 3D printing chamber in a predetermined temperature range;

input into the 3D printing chamber the determined relative quantities of air by an air valve controller connected to an air valve system having a first valve element selectively connecting the energy source chamber and a connection to the 3D printing chamber and a second valve element selectively connecting the external air input and the connection to the 3D printing chamber.

* * * * *